US012104011B2

(12) United States Patent
Choi et al.

(10) Patent No.: US 12,104,011 B2
(45) Date of Patent: Oct. 1, 2024

(54) BIOPOLYMER COMPOSITION, PREPARATION METHOD FOR SAME AND BIOPLASTIC USING SAME

(71) Applicant: LG CHEM, LTD., Seoul (KR)

(72) Inventors: Banseok Choi, Daejeon (KR); Jung Yun Choi, Daejeon (KR); Chul Woong Kim, Daejeon (KR); Sungwoon Heo, Daejeon (KR); Eungwon Kim, Daejeon (KR); Donggyun Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 126 days.

(21) Appl. No.: 17/631,057

(22) PCT Filed: Sep. 16, 2020

(86) PCT No.: PCT/KR2020/012500
§ 371 (c)(1),
(2) Date: Jan. 28, 2022

(87) PCT Pub. No.: WO2021/054721
PCT Pub. Date: Mar. 25, 2021

(65) Prior Publication Data
US 2022/0282030 A1    Sep. 8, 2022

(30) Foreign Application Priority Data

Sep. 16, 2019 (KR) .................. 10-2019-0113588
Sep. 16, 2019 (KR) .................. 10-2019-0113590

(51) Int. Cl.
*C08G 63/08* (2006.01)
*B29B 7/38* (2006.01)
*B29K 67/00* (2006.01)
*B29K 96/04* (2006.01)
*B29K 105/00* (2006.01)
*B29K 105/06* (2006.01)
*C08J 3/20* (2006.01)

(52) U.S. Cl.
CPC ............. *C08G 63/08* (2013.01); *C08J 3/203* (2013.01); *B29B 7/38* (2013.01); *B29K 2067/04* (2013.01); *B29K 2096/04* (2013.01); *B29K 2105/0085* (2013.01); *B29K 2105/06* (2013.01); *C08J 2367/04* (2013.01)

(58) Field of Classification Search
CPC .. B29B 7/38; B29B 7/48; B29B 7/726; B29B 7/728; B29B 7/826; B29B 9/06; B29B 9/12; C08L 101/16; C08L 51/00; C08L 67/04; C08K 5/005; C08J 2367/04; C08J 3/203; C08G 63/08; B29K 2067/04; B29K 2096/04; B29K 2105/0085; B29K 2105/06; B29K 2667/046; B29K 2995/0056; B29C 2948/92704; B29C 2948/92876; B29C 2948/92885; B29C 48/40; B29C 48/834
See application file for complete search history.

(56) References Cited

U.S. PATENT DOCUMENTS

| | | | |
|---|---|---|---|
| 8,765,402 B2 | 7/2014 | Park et al. | |
| 2005/0182196 A1* | 8/2005 | Khemani | C08L 67/02 |
| | | | 525/178 |
| 2007/0265371 A1* | 11/2007 | Takahashi | C08K 5/29 |
| | | | 523/124 |
| 2010/0003882 A1 | 1/2010 | Sumi et al. | |
| 2011/0046339 A1 | 2/2011 | Park et al. | |
| 2013/0065046 A1* | 3/2013 | Krishnaswamy | C08L 67/02 |
| | | | 524/404 |
| 2014/0329974 A1 | 11/2014 | Lim et al. | |
| 2020/0172680 A1 | 6/2020 | Choi et al. | |

FOREIGN PATENT DOCUMENTS

| | | |
|---|---|---|
| CN | 1908030 | * 2/2007 |
| CN | 101205356 | 6/2008 |
| JP | H06-298921 | 10/1994 |
| JP | 2001-281448 | 10/2001 |
| JP | 2010-510372 | 4/2010 |
| KR | 10-2003-0022514 | 3/2003 |
| KR | 10-2007-0109891 | 11/2007 |
| KR | 10-2008-0046795 | 5/2008 |
| KR | 10-2009-0098994 | 9/2009 |
| KR | 10-0957773 | 5/2010 |
| KR | 10-2013-0074607 | 7/2013 |
| KR | 10-1407691 | 6/2014 |
| KR | 10-2015-0040673 | 4/2015 |
| KR | 10-2018-0072481 | 6/2018 |
| KR | 10-2019-0078387 | 7/2019 |

(Continued)

OTHER PUBLICATIONS

Written Opinion of the International Searching Authority for PCT/KR2020/012500 Jan. 4, 2021 (Year: 2021).*
Björn Andreeßen et al."Poly(3-Hydroxypropionate): a Promising Alternative to Fossil Fuel-Based Materials", Applied and Environmental Microbiology—Nov. 2014 vol. 80 No. 21, pp. 6574-6582 (Year: 2014).*
Dahlia Haynes et al."In Situ Copolyesters Containing Poly(L-lactide) and Poly(hydroxyalkanoate) Units", Biomacromolecules 2007, 8, 1131-1137. (Year: 2007).*
Qi Wang et al "Production of Block Copolymer Poly(3-hydroxybutyrate)-block-poly(3-hydroxypropionate) with Adjustable Structure from an Inexpensive Carbon Source", ACS Macro Lett. 2013, 2, 996-1000. (Year: 2013).*

(Continued)

*Primary Examiner* — Frances Tischler
*Assistant Examiner* — Gennadiy Mesh
(74) *Attorney, Agent, or Firm* — Bryan Cave Leighton Paisner LLP

(57) ABSTRACT

Provided is a biopolymer composition, a preparation method for the same, and a bioplastic using the same, the biopolymer composition comprising at least 83.5 weight % of a copolymer resin of lactic acid (LA) and 3-hydroxypropionate (3HP), an antioxidant, and a lubricant, and the composition having an elongation percentage of at least 90% but not greater than 500%.

10 Claims, No Drawings

(56) References Cited

FOREIGN PATENT DOCUMENTS

KR    10-2019-0083816    7/2019

OTHER PUBLICATIONS

Ramier et al., "Microwave-Assisted Synthesis and Characterization of Biodegradable Block Copolyesters Based on Poly(3-hydroxyalkanoate)s and Poly(D,L-lactide)," Journal of Polymer Science Part A: Polymer Chemistry 50:1445-1455 (2012).

* cited by examiner

BIOPOLYMER COMPOSITION, PREPARATION METHOD FOR SAME AND BIOPLASTIC USING SAME

CROSS-REFERENCE TO RELATED APPLICATIONS

This application is a National Stage Application of International Application No. PCT/KR2020/012500 filed on Sep. 16, 2020, which claims priority to and the benefit of Korean Patent Application No. 10-2019-0113590 and Korean Patent Application No. 10-2019-0113588, each filed with the Korean Intellectual Property Office on Sep. 16, 2019, the entire contents of which are incorporated herein by reference.

Technical Field

The present specification relates to a biopolymer composition, a method for preparing the same, and a bioplastic using the same.

Background

Existing plastics do not decompose in a short period of time and have become a main cause of environmental pollution, and accordingly, researches on biodegradable environmental-friendly biopolymers and bioplastics have been actively ongoing.

Polylactic acid is known as a biopolymer having excellent mechanical properties such as tensile strength and elastic modulus while having biodegradability, but has limitations as a general-purpose resin due to its readily breaking properties (brittleness) caused by poor elongation properties.

In order to improve the elongation properties of polylactic acid, two or more resins have been mixed through solution polymerization (solution blending) in the art, however, there are disadvantages in that mass production is limited, and properties can turn out different.

Accordingly, methods for preparing a biopolymer composition with enhanced elongation while being advantageous for later mass production and enabling stable property evaluations have been required.

Brief Description

Technical Problem

The present specification is directed to providing a biopolymer composition having high elongation properties.

The present specification is directed to providing a biopolymer composition having enhanced impact strength.

The present specification is directed to providing a method for preparing a biopolymer composition capable of mass producing a biopolymer composition with high elongation and capable of stable property evaluations.

Technical Solution

One embodiment of the present specification provides a biopolymer composition including a copolymer resin of lactic acid (LA) and 3-hydroxypropionate (3HP) in 83.5% by weight or greater; an antioxidant; and a lubricant, wherein elongation of the biopolymer composition is greater than or equal to 90% and less than or equal to 500%.

Another embodiment of the present specification provides a method for preparing a biopolymer composition, the method including preparing a copolymer resin of lactic acid (LA) and 3-hydroxypropionate (3HP); forming a mixture by mixing an antioxidant and a lubricant to the copolymer resin; and compounding the mixture using an extrusion process.

Advantageous Effects

A biopolymer composition according to one embodiment of the present specification has high elongation while having excellent mechanical properties.

A biopolymer composition according to one embodiment of the present specification has high impact strength while having excellent mechanical properties.

By using a method for preparing a biopolymer composition according to one embodiment of the present specification, a biopolymer composition having high elongation can be mass-produced, and stable property evaluations can be performed.

DETAILED DESCRIPTION

Hereinafter, the present specification will be described in more detail.

In the present specification, a certain part "including" certain constituents means capable of further including other constituents, and does not exclude other constituents unless particularly stated to the contrary.

In the present specification, being "polymerized" means the polymerized compound being included as a comonomer. A copolymer resin prepared by polymerizing the comonomers includes a structure excluding a terminal linking group used for polymerization in the comonomer as a repeating structure.

In the present specification, elongation, tensile strength and tensile modulus represent mechanical properties of a plastic, and specific descriptions will be provided below.

Elongation is also referred to as elongation at break, and represents a percentage increased to a point when a plastic breaks, and can be calculated by the following equation. The unit is %.

$$\text{Elongation (\%)} = \frac{\text{Length increase at point of breakage}}{\text{Original length}} \times 100$$

Tensile strength means maximum stress when plastic breaks due to a tensile load, and can be calculated by the following equation. The unit is MPa.

$$\text{Tensile strength } (MPa) = \frac{\text{Load when breaking } (N)}{\text{Area } (mm^2)}$$

Tensile modulus means a ratio of stress to strain in a section when strain to stress changes linearly, and can be calculated by the following equation. The unit is GPa.

$$\text{Tensile modulus } (GPa) = \frac{\text{Tensile stress } (kg/cm^2)}{\text{Strain at applied tensile stress (\%)}}$$

In one embodiment of the present specification, elongation, tensile strength and tensile modulus of the biopolymer composition are measured in accordance with ASTM D638, and after preparing the biopolymer composition into a pellet form, the result is processed into a dog bone specimen, and measured using a universal testing machine (UTM). Herein, the measurement rate is 10 mm/min.

Impact strength is obtained by dividing energy required to break a plastic material by an impact load by a unit area, and impact strength measurement methods such as Izod, Charpy, falling weight or dart and tensile impact strength are used. In the present specification, an Izod impact strength measurement method is used.

In one embodiment of the present specification, impact strength of the biopolymer composition is measured using an Izod impact strength measurement method, and after processing the biopolymer composition prepared in a pellet foam to an impact strength specimen using injection molding, the Izod impact is analyzed. Specifically, the Izod impact strength measurement method is a method using a pendulum with a certain weight, and impact strength is obtained by dividing absorption energy, which is obtained from a rotating height during rotation by striking a pendulum on the specimen, by a cross-sectional area of the notch portion of the specimen. The plastic specimen is placed vertically, impact is applied to the upper part of the specimen, and energy (force) required to break the specimen is measured. Accordingly, the Izod impact strength increases as the radius of the notch portion decreases.

In one embodiment of the present specification, polylactic acid (PLA) is a polymer of lactic acid, and is a thermoplastic aliphatic polyester extracted from a renewable biomass. Herein, the biomass means a plant or animal material used as a raw material in the industrial field.

The polylactic acid is one type of biopolymer having biodegradability and has a repeating unit of the following Chemical Formula 1, and the repetition number (n) can be from 1 to 5000:

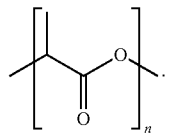

<Chemical Formula 1>

In one embodiment of the present specification, poly 3-hydroxypropionate (P(3HP)) is a polymer of 3-hydroxypropionate and is one of a polyhydroxyalkanoate, and the polyhydroxyalkanoate is, as a compound synthesized by microorganisms, a biopolymer having biodegradability.

The poly 3-hydroxypropionate (P(3HP)) is a polyester and has a repeating unit of the following Chemical Formula 2, and the repetition number (n) can be from 1 to 5000:

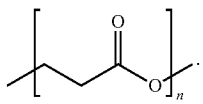

<Chemical Formula 2>

In one embodiment of the present specification, the copolymer resin is obtained by polymerizing lactic acid (LA) and 3-hydroxypropionate (3HP) in a weight ratio of 1:99 to 99:1, and the weight ratio is preferably from 5:95 to 95:5, and more preferably from 10:90 to 90:10.

In one embodiment of the present specification, the copolymer resin can be obtained by polymerizing lactic acid (LA) and 3-hydroxypropionate (3HP) in 50:50 to 90:10, or 70:30 to 90:10.

In one embodiment of the present specification, the copolymer resin is obtained by polymerizing polylactic acid (PLA) and poly 3-hydroxypropionate (P(3HP)).

In one embodiment of the present specification, the copolymer resin can be a random copolymer, a block copolymer or an alternating copolymer.

In one embodiment of the present specification, the copolymer resin is a block copolymer resin of the lactic acid (LA) and the 3-hydroxypropionate (3HP).

In one embodiment of the present specification, the copolymer resin can be directly prepared and used, and can be prepared using a common copolymer preparation method. For example, the copolymer resin can be prepared using solution polymerization.

When the lactic acid (LA) and the 3-hydroxypropionate (3HP) are included in the biopolymer composition after being polymerized to the copolymer resin, a single resin is used, and a dispersant is not required since it is not necessary to blend the two types of polymer resins. Accordingly, a biopolymer composition with enhanced elongation while being advantageous in terms of preparation costs and preparation process can be provided.

The biopolymer composition according to one embodiment of the present specification includes the copolymer resin of the lactic acid (LA) and the 3-hydroxypropionate (3HP) in an amount greater than or equal to 83.5% by weight and less than 100% by weight.

In one embodiment of the present specification, the biopolymer composition can include the copolymer resin in an amount greater than or equal to 99% by weight and less than 100% by weight. The biopolymer composition including the copolymer resin in an amount of 99% by weight or greater has superior biodegradability, and accordingly, an environmental-friendly product using the biopolymer composition can be provided.

In one embodiment of the present specification, the biopolymer composition can further include an antioxidant in an amount of 0.01 parts by weight to 0.5 parts by weight and preferably in an amount of 0.1 parts by weight to 0.4 parts by weight with respect to a total 100 parts by weight of the biopolymer composition.

Including the antioxidant in less than 0.01 parts by weight has a problem of producing oxidative decomposition due to heat in the extrusion process, and including the antioxidant in an amount greater than 0.5 parts by weight has a problem of declining biodegradability of the biopolymer composition.

In one embodiment of the present specification, the biopolymer composition can further include a lubricant in an amount of 0.01 parts by weight to 0.5 parts by weight and preferably in an amount of 0.1 parts by weight to 0.3 parts by weight with respect to a total 100 parts by weight of the biopolymer composition.

When including the lubricant within the above-mentioned content range, extrusion processing is readily performed, and uniform properties can be obtained after the extrusion. On the other hand, including the lubricant in an amount less than 0.01 parts by weight has a problem of reducing extrusion processability, and including the lubricant in an amount greater than 0.5 parts by weight has a problem of declining biodegradability of the biopolymer composition.

Types of the antioxidant can include a hindered phenol-based antioxidant, an amine-based antioxidant, a thio-based antioxidant, a phosphine-based antioxidant and the like. The antioxidant can be used in one type or as a mixture of two or more types, but is not limited thereto. Specific examples thereof can include a phosphoric acid-based thermal stabilizer such as phosphoric acid, trimethyl phosphate or triethyl phosphate; a hindered phenol-based primary antioxidant such as 2,6-di-t-butyl-p-cresol, octadecyl-3-(4-hydroxy-3,5-di-t-butylphenyl)propionate, tetrabis[methylene-3-(3,5-di-t-butyl-4-hydroxyphenyl)-propionate]methane, 1,3,5-trimethyl-2,4,6-tris(3,5-di-t-butyl-4-hydroxybenzyl)-benzene, 3,5-di-t-butyl-4-hydroxy-benzylphosphite diethyl ester, 2,2-thiobis(4-methyl-6-t-butyl-phenol), 2,6-g,t-butylphenol 4,4'-butylidene-bis(3-methyl-6-t-butylphenol), 4,4'-thiobis (3-methyl-6-t-butyl-phenol), bis[3,3-bis-(4'-hydroxy-3'-tert-butylphenyl)-butanoic acid]glycol ester, or pentaerythritol tetrakis(3-(3,5-di-tert-butyl-4-hydroxyphenyl)propionate) (or 2,2-bis(((3-(3,5-di-tert-butyl-4-hydroxyphenyl)propanoyl)-oxy)methyl)propane-1,3-diyl bis(3-(3,5-di-tert-butyl-4-hydroxyphenyl)propanoate)); an amine-based secondary antioxidant such as phenyl-a-naphthylamine, phenyl-β-naphthylamine, N,N'-diphenyl-p-phenylenediamine or N,N'-di--naphthyl-p-phenylenediamine; a thio-based secondary antioxidant such as dilauryl disulfide, dilauryl thiopropionate, distearyl thiopropionate, mercaptobenzothiazole or tetramethylthiuram disulfide tetrabis[methylene-3-(laurylthio)propionate]methane; or a phosphite-based secondary antioxidant such as triphenyl phosphite, tris(nonylphenyl)phosphite, triisodecyl phosphite, bis(2,4-dibutylphenyl)pentaerythritol diphosphite, tris-(2,4-di-tert-butylphenyl)phosphite or (1,1'-biphenyl)-4,4'-diylbisphosphonous acid tetrakis[2,4-bis(1,1-dimethylethyl)phenyl] ester.

In one embodiment of the present specification, the antioxidant can be a hindered phenol-based antioxidant.

As the lubricant, a mixture of any one external lubricant selected from the group consisting of low molecular weight polyethylene oxide, wax, polyethylene, oxidized stearic acid and stearic acid and any one internal lubricant selected from the group consisting of aromatic alcohol, low fatty acid and metal stearic acid can be used, however, the lubricant is not limited thereto.

In one embodiment of the present specification, the lubricant can include a secondary antioxidant, and can preferably include a phosphite-based secondary antioxidant.

In one embodiment of the present specification, the secondary antioxidant can be tris-(2,4-di-tert-butylphenyl) phosphite.

In one embodiment of the present specification, the biopolymer composition has elongation of greater than or equal to 90% and less than or equal to 500%, preferably greater than or equal to 95% and less than or equal to 500%, and more preferably greater than or equal to 100% and less than or equal to 500%.

When using existing compounding resins, for example, PBAT (poly(butylene adipate terephthalate)) or PBS (poly(butylene succinate)), in order to increase low elongation of polylactic acid, elongation increases, however, tensile properties relatively decline, whereas the biopolymer composition according to the present disclosure has high elongation while maintaining tensile strength, and therefore, can be used as a material in the packaging field.

In one embodiment of the present specification, the biopolymer composition can have tensile strength of greater than or equal to 40 MPa and less than or equal to 70 MPa, or greater than or equal to 50 MPa and less than or equal to 70 MPa, and can have tensile modulus of greater than or equal to 2.5 GPa and less than or equal to 5 GPa, or greater than or equal to 3 GPa and less than or equal to 5 GPa.

In one embodiment of the present specification, the biopolymer composition can have impact strength of greater than or equal to 60 J/m and less than or equal to 200 J/m.

In another embodiment, the biopolymer composition includes the copolymer resin in an amount greater than or equal to 83.5% by weight and less than or equal to 94.5% by weight; an antioxidant; and a lubricant, and can further include a strength reinforcing agent and a dispersant. When including the strength reinforcing agent and the dispersant, the biopolymer composition can have impact strength of greater than or equal to 100 J/m and less than or equal to 200 J/m.

In one embodiment of the present specification, the biopolymer composition can include the copolymer resin in an amount greater than or equal to 83.5% by weight and less than or equal to 94.5% by weight, preferably in an amount greater than or equal to 87% by weight and less than or equal to 94.5% by weight, and more preferably in an amount greater than or equal to 87% by weight and less than or equal to 90% by weight.

The strength reinforcing agent can include a silicone-based strength reinforcing agent, an acryl-based strength reinforcing agent, a butadiene-based strength reinforcing agent and a silicone-acryl-based strength reinforcing agent, but is not limited thereto, and those skilled in the art can select and use a proper strength reinforcing agent.

In one embodiment of the present specification, the strength reinforcing agent is a silicone-acryl-based strength reinforcing agent. The biopolymer composition including the silicone-acryl-based strength reinforcing agent has an advantage of having superior low temperature impact strength and chemical resistance impact strength.

The dispersant can include a polymer-type, a nonionic, an anionic or a cationic dispersant, and specific examples thereof can include one or more types selected from the group consisting of polyalkylene glycols and esters thereof, polyoxyalkylene polyhydric alcohols, ester alkylene oxide adducts, alcohol alkylene oxide adducts, sulfonic acid esters, sulfonic acid salts, carboxylic acid esters, carboxylic acid salts, alkylamide alkylene oxide adducts and alkylamines, but are not limited thereto.

In one embodiment of the present specification, the biopolymer composition can include the strength reinforcing agent in an amount of 5 parts by weight to 15 parts by weight and can include the dispersant in an amount of 0.5 parts by weight to 1.5 parts by weight with respect to a total 100 parts by weight of the biopolymer composition. By including the strength reinforcing agent and the dispersant, a biopolymer composition with enhanced impact strength can be provided. When including the strength reinforcing agent and the dispersant in less than the above-mentioned range, tensile properties of the biopolymer composition, that is, elongation, tensile strength and tensile modulus, decline, and when including the strength reinforcing agent and the dispersant in greater than the above-mentioned range, the biopolymer is included less causing a problem of declining biodegradation capability.

In one embodiment of the present specification, the biopolymer composition including the strength reinforcing agent and the dispersant can have tensile strength of greater than or equal to 40 MPa and less than or equal to 60 MPa and tensile modulus of greater than or equal to 2.5 GPa and less than or equal to 4.5 GPa.

In one embodiment of the present specification, the biopolymer composition including the strength reinforcing agent and the dispersant can have impact strength of greater than or equal to 100 J/m and less than or equal to 200 J/m, and preferably greater than or equal to 120 J/m and less than or equal to 200 J/m. The impact strength is measured using an Izod impact strength measurement method, and after processing the biopolymer composition prepared in a pellet form to an impact strength specimen using injection molding, the Izod impact is analyzed.

In one embodiment of the present specification, the biopolymer composition is prepared using an extrusion process. The biopolymer composition prepared through an extrusion process has higher elongation compared to a biopolymer composition prepared through a solution blending process.

In another embodiment, the biopolymer composition including the strength reinforcing agent and the dispersant is prepared using an extrusion process, and can provide excellent impact strength compared to a biopolymer composition prepared through a solution blending process.

One embodiment of the present specification provides a method for preparing the biopolymer composition described above, the method including preparing a copolymer resin of lactic acid (LA) and 3-hydroxypropionate (3HP); forming a mixture by mixing an antioxidant and a lubricant to the copolymer resin; and compounding the mixture using an extrusion process.

The method for preparing the biopolymer composition according to one embodiment of the present specification can further include adding a strength reinforcing agent and a dispersant to the mixture prior to the compounding using an extrusion process.

In one embodiment of the present specification, the compounding using an extrusion process uses an extruder, and as the extruder, a water-cooled twin screw extruder can be used.

In one embodiment of the present specification, the water-cooled twin screw extruder has an extrusion screw speed of 100 rpm to 200 rpm, preferably 100 rpm to 150 rpm, and more preferably 100 rpm to 120 rpm.

In one embodiment of the present specification, the water-cooled twin screw extruder has a pelletizer speed of 100 rpm to 500 rpm, preferably 200 rpm to 500 rpm, and more preferably 300 rpm to 400 rpm.

In one embodiment of the present specification, the extruder can be a co-rotating twin screw extruder, and the compounding can be readily progressed by controlling the screw speed and the pelletizer speed in the extruder.

In one embodiment of the present specification, a final discharge portion of the screw of the water-cooled twin screw extruder has a temperature of 170° C. to 250° C., preferably 190° C. to 250° C., and more preferably 200° C. to 230° C. The final discharge portion of the screw can mean a portion corresponding to 1/20 of the total length of the screw. When the temperature at the final discharge portion is too low, the resin may not be discharged smoothly, and when the temperature is too high, the polymer may have degraded properties and be discolored.

In one embodiment of the present specification, the rest of the screw portion other than the final discharge portion of the water-cooled twin screw extruder has a temperature of 160° C. to 220° C., preferably 180° C. to 220° C., and more preferably 180° C. to 200° C.

In one embodiment of the present specification, a main hopper of the water-cooled twin screw extruder has a temperature of 130° C. to 200° C., preferably 150° C. to 200° C., and more preferably 150° C. to 170° C.

One embodiment of the present specification provides a bioplastic including the biopolymer composition described above.

In one embodiment of the present specification, a method for preparing a bioplastic using the biopolymer composition is not particularly limited as long as it is a method used in the art.

The bioplastic can be used as a packaging material, a film, a fiber, a medical device, a container or the like, however, the application is not limited thereto.

Hereinafter, the present specification will be described in more detail with reference to examples. However, the following examples are for illustrative purposes only, and are not intended to limit the present specification.

<Experimental Example 1> Preparation of Biopolymer Composition

Example 1

99.5% by weight of a copolymer resin (PLH, weight ratio of PLA and P(3HP): 90:10), 0.3% by weight of an antioxidant (Irganox 1010) and 0.2% by weight of a lubricant (Irgafos 168, including secondary antioxidant) were added to a water-cooled twin screw extruder, and then compounded and pelletized under a condition of an extrusion screw speed (100 rpm), a pelletizer speed (400 rpm), a screw final discharge portion temperature (210° C.), the rest of the screw portion temperature (190° C.) and a main hopper temperature (160° C.)

Example 2

Preparation was made in the same manner as in Example 1 except that 88% by weight of the copolymer resin (PLH), 10% by weight a strength reinforcing agent (Biostrength-150) and 1.5% by weight of a dispersant (BYK-P-401) were added instead of 99.5% by weight of the copolymer resin (PLH) of Example 1.

Comparative Example 1

100% by weight of a copolymer resin (PLH, weight ratio of PLA and P(3HP): 90:10) was added to a water-cooled twin screw extruder, and then compounded and pelletized under a condition of an extrusion screw speed (100 rpm), a pelletizer speed (400 rpm), a screw final discharge portion temperature (210° C.), the rest of the screw portion temperature (190° C.) and a main hopper temperature (160° C.)

Comparative Example 2

89.5% by weight of polylactic acid (PLA), 10% by weight of poly 3-hydroxypropionate (P(3HP)), 0.3% by weight of an antioxidant (Irganox 1010) and 0.2% by weight of a lubricant (Irgafos 168) were introduced to chloroform, and then mixed and dried at room temperature.

Comparative Example 3

Preparation was made in the same manner as in Example 1 except that 89.5% by weight of polylactic acid (PLA) and 10% by weight of poly(butylene adipate terephthalate) (PBAT) were added instead of 99.5% by weight of the copolymer resin (PLH) of Example 1.

Comparative Example 4

Preparation was made in the same manner as in Example 1 except that 79.2% by weight of polylactic acid (PLA), 8.8% by weight of poly(butylene adipate terephthalate) (PBAT), 10% by weight of a strength reinforcing agent and 1.5% by weight of a dispersant were added instead of 99.5% by weight of the copolymer resin (PLH) of Example 1.

Comparative Example 5

Preparation was made in the same manner as in Example 1 except that 89.5% by weight of polylactic acid (PLA) and 10% by weight of poly(butylene succinate) (PBS) were added instead of 99.5% by weight of the copolymer resin (PLH) of Example 1.

Comparative Example 6

Preparation was made in the same manner as in Example 1 except that 79.2% by weight of polylactic acid (PLA), 8.8% by weight of poly(butylene succinate) (PBS), 10% by weight of a strength reinforcing agent and 1.5% by weight of a dispersant were added instead of 99.5% by weight of the copolymer resin (PLH) of Example 1.

<Experimental Example 2> Measurement of Mechanical Properties of Biopolymer Composition Each of the biopolymer compositions of Examples 1 and 2 and Comparative Examples 1 to 6 was processed to a dog bone specimen using a compression method, and then elongation, tensile strength and tensile modulus were measured (measurement rate: 10 ram/min) using a universal testing machine (UTM).

In addition, each of the pelletized biopolymer compositions of Examples 1 and 2 and Comparative Examples 1 to 6 was processed to an impact strength specimen using injection molding, and the Izod impact was analyzed.

The measurement results are described in the following Table 1, and in the following Table 1, parts by weight of the biopolymer was based on the total weight of the biopolymer composition.

In addition, it was seen that Example 1 compounded using an extrusion process with an antioxidant and a lubricant according to the present disclosure had higher tensile strength and higher tensile modulus compared to Comparative Example 1 extrusion compounded without an antioxidant and a lubricant. In other words, it was identified that an antioxidant and a lubricant need to be essentially included in order for compounding using an extrusion process.

Comparative Example 2 is a result of compounding using a solution blending process instead of extrusion compounding, and when compared to Example 1 according to the present disclosure, it was seen that tensile strength, tensile modulus and impact strength were low, and elongation was particularly inferior.

Example 2, in which a strength reinforcing agent and a dispersant were further added, had impact strength two times higher than Example 1, and when compared to Comparative Examples 4 and 6 not including the copolymer resin (PLH) of the present disclosure, it was identified that Comparative Examples 4 and 6 had impact strength two times or more lower compared to Example 2 even with a strength reinforcing agent and a dispersant.

The invention claimed is:

1. A biopolymer composition, comprising:
   a copolymer resin of lactic acid (LA) and 3-hydroxypropionate (3HP) in an amount of 83.5% by weight or greater and less than 100% by weight;
   an antioxidant; and
   a lubricant,
   wherein the copolymer resin is a block copolymer of the lactic acid (LA) and the 3-hydroxypropionate (3HP) and a weight ratio of the lactic acid (LA) to the 3-hydroxypropionate (3HP) in the copolymer resin is in a range of 70:30 to 90:10,
   wherein elongation of the biopolymer composition is greater than or equal to 90% and less than or equal to 500%, and

TABLE 1

| | Biopolymer | | Antioxidant | Lubricant | Strength Reinforcing Agent | Dispersant | Tensile Strength (MPa) | Tensile Modulus (GPa) | Elongation (%) | Impact Strength (J/m) |
| --- | --- | --- | --- | --- | --- | --- | --- | --- | --- | --- |
| | Type | Parts by Weight | | | | | | | | |
| Example 1 | PLH | 99.5 | 0.3 | 0.2 | — | — | 51 | 3.1 | 100 | 63 |
| Example 2 | PLH | 88 | 0.3 | 0.2 | 10 | 1.5 | 45.4 | 2.6 | 96 | 120 |
| Comparative Example 1 | PLH | 100 | — | — | — | — | 31 | 1.6 | 110 | 60 |
| Comparative Example 2 | PLA P(3HP) | 89.5 10 | 0.3 | 0.2 | — | — | 48.6 | 2.9 | 58.7 | 40 |
| Comparative Example 3 | PLA PBAT | 89.5 10 | 0.3 | 0.2 | — | — | 55.4 | 2.5 | 3.1 | 24.2 |
| Comparative Example 4 | PLA PBAT | 79.2 8.8 | 0.3 | 0.2 | 10 | 1.5 | 38.7 | 2.1 | 210 | 57.6 |
| Comparative Example 5 | PLA PBS | 89.5 10 | 0.3 | 0.2 | — | — | 57 | 2.5 | 3.5 | 22.4 |
| Comparative Example 6 | PLA PBS | 79.2 8.8 | 0.3 | 0.2 | 10 | 1.5 | 42.4 | 2.1 | 171 | 41.3 |

From the results shown in Table 1, it was identified that the biopolymer composition of Example 1 according to the present disclosure had elongation of approximately 1.7 times, 32 times and 29 times compared to Comparative Examples 2, 3 and 5, respectively, not including the copolymer resin (PLH) of the present disclosure while having similar levels of tensile strength and tensile modulus.

each of the antioxidant and the lubricant are present in an amount of 0.1 parts by weight to 0.5 parts by weight with respect to a total 100 parts by weight of the biopolymer composition.

2. The biopolymer composition of claim 1 comprising the copolymer resin of lactic acid (LA) and 3-hydroxypropionate (3HP) in an amount of 99% by weight or greater.

3. The biopolymer composition of claim 1, which has tensile strength of greater than or equal to 40 MPa and less than or equal to 70 MPa, and tensile modulus of greater than or equal to 2.5 GPa and less than or equal to 5 GPa.

4. The biopolymer composition of claim 1 comprising:
the copolymer resin in an amount greater than or equal to 83.5% by weight and less than or equal to 94.5% by weight, and, further comprising:
a strength reinforcing agent; and
a dispersant,
wherein impact strength is greater than or equal to 100 J/m and less than or equal to 200 J/m.

5. The biopolymer composition of claim 4, wherein the strength reinforcing agent is selected from among a silicone-based strength reinforcing agent, an acryl-based strength reinforcing agent, a butadiene-based strength reinforcing agent, and a silicone-acryl-based strength reinforcing agent.

6. The biopolymer composition of claim 4 comprising:
the strength reinforcing agent in an amount of 5% by weight to 15% by weight; and
the dispersant in an amount of 0.5% by weight to 1.5% by weight, with respect to total 100% by weight of the biopolymer composition.

7. The biopolymer composition of claim 4, which has tensile strength of greater than or equal to 40 MPa and less than or equal to 60 MPa, and tensile modulus of greater than or equal to 2.5 GPa and less than or equal to 4.5 GPa.

8. A bioplastic comprising the biopolymer composition of claim 1.

9. The biopolymer composition of claim 1, wherein the antioxidant comprises pentaerythritol tetrakis(3-(3,5-di-tert-butyl-4- hydroxyphenyl)propionate).

10. The biopolymer composition of claim 1, wherein the antioxidant comprises a secondary antioxidant selected from among triphenyl phosphite, tris(nonylphenyl)phosphite, triisodecyl phosphite, bis(2,4-dibutylphenyl)pentaerythritol diphosphite, tris-(2,4-di-tert-butylphenyl)phosphite.

* * * * *